United States Patent
Shilton et al.

(10) Patent No.: US 10,811,156 B2
(45) Date of Patent: Oct. 20, 2020

(54) DEVICE AND METHOD FOR ENHANCED IRIDIUM GAMMA RADIATION SOURCES

(71) Applicant: QSA GLOBAL INC., Burlington, MA (US)

(72) Inventors: Mark G. Shilton, Chelmsford, MA (US); Mark W. Vose, Windham, NH (US)

(73) Assignee: QSA GLOBAL INC., Burlington, MA (US)

( * ) Notice: Subject to any disclaimer, the term of this patent is extended or adjusted under 35 U.S.C. 154(b) by 604 days.

(21) Appl. No.: 15/308,126

(22) PCT Filed: May 8, 2015

(86) PCT No.: PCT/US2015/029806
§ 371 (c)(1),
(2) Date: Nov. 1, 2016

(87) PCT Pub. No.: WO2015/175326
PCT Pub. Date: Nov. 19, 2015

(65) Prior Publication Data
US 2017/0084357 A1    Mar. 23, 2017

Related U.S. Application Data

(60) Provisional application No. 61/992,473, filed on May 13, 2014.

(51) Int. Cl.
*G21G 4/06*    (2006.01)

(52) U.S. Cl.
CPC ....... *G21G 4/06* (2013.01); *G01N 2223/1013* (2013.01)

(58) Field of Classification Search
CPC .............................................. G01N 2223/1013
See application file for complete search history.

(56) References Cited

U.S. PATENT DOCUMENTS

| 6,099,458 A | 8/2000 | Robertson |
| 7,118,729 B1 | 10/2006 | O'Foghludha |

(Continued)

FOREIGN PATENT DOCUMENTS

| DE | 19824689 | 10/1999 |
| DE | 19824689 C1 | 10/1999 |

(Continued)

OTHER PUBLICATIONS

Zhao, Wen Jie et al.; "Structural, mechanical, and electronic properties of $TaB_2$, TaB, $IrB_2$, and IrB: First-principal calculations", *Journal of Solid State Chemistry*, 182, Dec. 31, 2009, pp. 2880-2886.

(Continued)

*Primary Examiner* — Hoon K Song
(74) *Attorney, Agent, or Firm* — McCarter & English, LLP

(57) ABSTRACT

This disclosure pertains to a gamma radiation source, including enriched Iridium-191 and Boron-11. Some embodiments may include alloying. Some embodiments may include sintering. The resulting disk, adapted for radiological sources, typically has a reduced attenuation and a reduced cost, due to the reduction in the use of Iridium-191. Substitutes for boron include aluminum, silicon, vanadium, titanium, nickel, platinum, phosphorus and/or combinations thereof.

21 Claims, 2 Drawing Sheets

(56) References Cited

U.S. PATENT DOCUMENTS

| | | | |
|---|---|---|---|
| 8,170,172 | B2 | 5/2012 | Uhland |
| 2004/0242953 | A1 | 12/2004 | Good |
| 2004/0258614 | A1 | 12/2004 | Line et al. |
| 2005/0247379 | A1 | 11/2005 | Klein et al. |
| 2012/0031613 | A1 | 2/2012 | Green |
| 2012/0035437 | A1* | 2/2012 | Ferren .................. A61B 1/041 600/302 |
| 2016/0232989 | A1* | 8/2016 | Zuppero ............. H02N 11/002 |
| 2020/0038373 | A1* | 2/2020 | Sandanayaka .......... A61P 11/00 |

FOREIGN PATENT DOCUMENTS

| | | |
|---|---|---|
| EP | 2428966 | 3/2012 |
| RU | 2 152 096 | 6/2000 |
| RU | 2152096 C1 | 6/2000 |
| RU | 95166 U1 | 6/2010 |
| WO | 2004109716 A2 | 12/2004 |

OTHER PUBLICATIONS

Raghavan, V.: "Al-B-Ir (Aluminum-Boron-Iridium)", *Journal of Phase Equilibria and Diffusion*, vol. 29, No. 1, Dec. 31, 2008, p. 42.

Li, Zeng Feng et al.: "Strengthening effect of microaloying on heat resistant Ir alloy, *Heat Treatment of Metals*", vol. 38, No. 3, Mar. 2013, pp. 56-60. In Chinese with English abstract.

ISR and WO for PCT/US2015/029806 dated Sep. 21, 2015.

International Search Report issued in PCT/US2015/029806 dated Sep. 21, 2015.

V. Raghavan, "Al—B—Ir (Aluminum-Boron-Iridum)", Journal of Phase Equilibria and Diffusion, vol. 29, No. 1, 2008, p. 42.

V. Raghavan, "Al—Ir—V (Aluminum-Iridium-Vanadium)", Journal of Phase Equilibria and Diffusion, vol. 29, No. 4, 2008, p. 372.

H. Ipser and P. Rogl, "Constitution Diagrams of the Binary Systems Pd-B and Ir—B", Elsevier Sequoia/Printed in The Netherlands, Metall. Trans. A., 1981, p. 363.

G. B. Ulrich, "The Metallurgical Integrity of the Frit Vent Assembly Diffusion Bond", Process Metallurgy Department Development Organization, Jun. 1994, p. 1-22.

Himikatus.Ru, https://www.himikatus.ru/art/phase-diagr1/Al-Ir.php, pp. 1-5.

"Boron-11 Isotope", American Elements, https://www.americanelements.com/boron-11-isotope-14798-13-1, pp. 1-8.

* cited by examiner

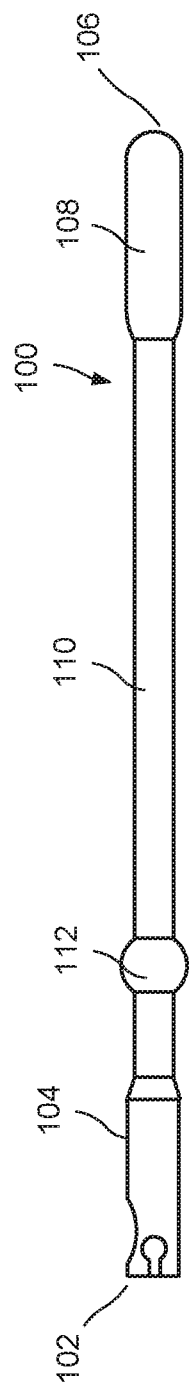
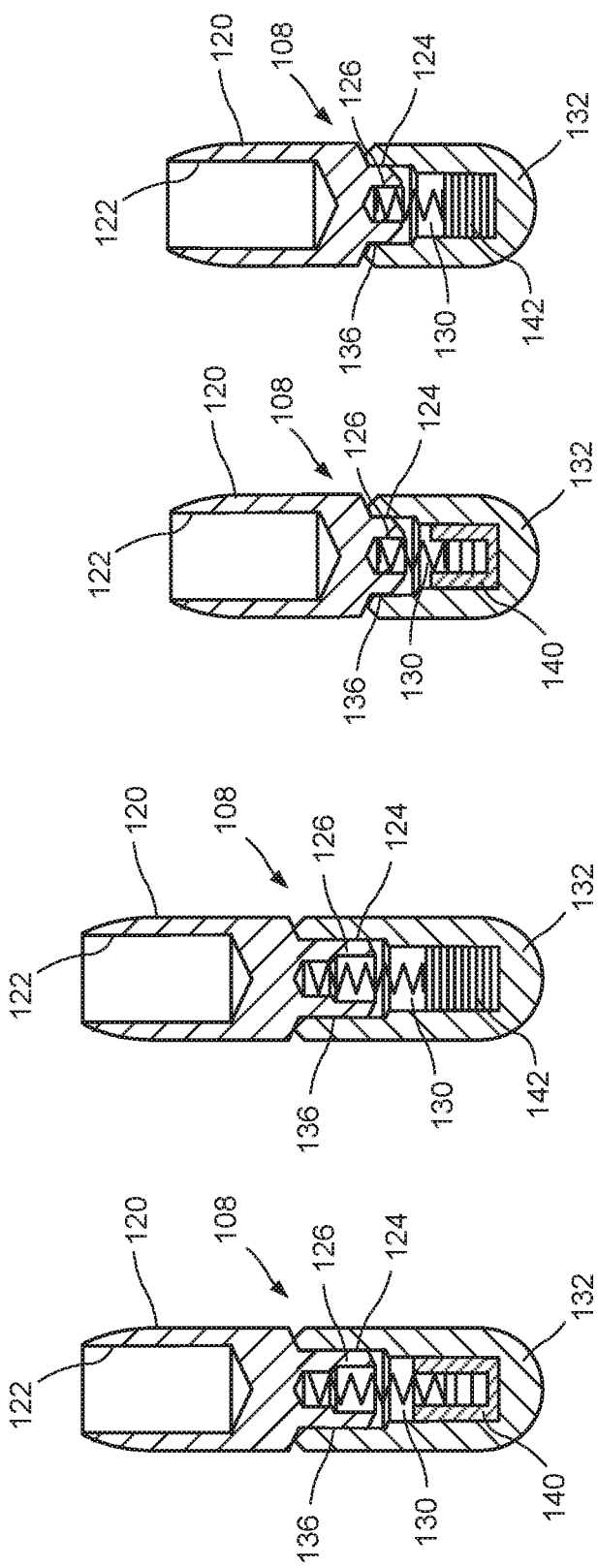

DEVICE AND METHOD FOR ENHANCED IRIDIUM GAMMA RADIATION SOURCES

This application is a National Phase of International Application No. PCT/US2015/029806, filed May 8, 2015, and claims priority under 35 U.S.C. 119(e) of U.S. provisional patent application Ser. No. 61/992,473, filed on May 13, 2014, the disclosure of which is hereby incorporated by reference in its entirety, for all purposes, and made a part thereof.

BACKGROUND OF DISCLOSURE

Field of Disclosure

This disclosure e pertains to a gamma radiation source, including enriched Iridium-191 with additives, which lower the density, increase activation yield and gamma ray emission efficiency, which additives include, but are not limited to, boron, aluminum, silicon, vanadium, titanium, nickel, platinum, phosphorus and/or combinations thereof.

Description of the Prior Art

In the prior art, Iridium-192 gamma radiography sources are manufactured by encapsulating stacked disks or pellets of activated iridium metal into a source capsule with an attaching wire or cable to provide a source reference assembly. This is illustrated in FIGS. 1A-1E. Common source activities range from 10 curie-150 curie and use different capsule sizes, disk or pellet diameters and various stack heights. A 100 curie natural iridium source may typically contain a stack of disks measuring about 3 millimeters in diameter and about 3 millimeters high. This varies from manufacturer to manufacturer and depends on the age and decay of the contained Iridium-192. A 100 curie source containing enriched Iridium-192 may contain a stack of disks as small as a 2 millimeter diameter and a 2 millimeter height or a 3 millimeter diameter and a 1.5 millimeter height. Individual iridium disks typically have a thickness up to about 0.3 millimeters, Above this thickness, activation efficiency decreases substantially due to the high neutron absorption cross section of iridium, which prevents neutrons from penetrating very far beneath the surface of disks.

Disks are stacked inside sources to produce a cylindrical geometry. High activity sources are made with multiple thin disks so that the activation yield of each individual disk in the reactor is maximized, however low activity Iridium-192 sources (up to about 20 curies) can be made using small single pellets providing the maximum pellet dimension is kept below about 1 millimeter to ensure that activation yield is not too impaired.

A problem that is encountered when activating natural iridium, which contains approximately 37 percent Iridium-191 and approximately 63 percent Iridium-193, is that the majority isotope (Ir-193) is also activated. Iridium-193 also has a very high neutron absorption cross section similar to Iridium-191 and it activates uselessly to form Iridium-194, which is a short-lived unwanted radioisotope. This means that activations of natural iridium wastes valuable neutrons in a reactor, and increases irradiation costs, relative to the cost of irradiating enriched Iridium-191.

Ir-191 can be economically enriched to a concentration of about 80 percent Iridium-191 and 20 percent Iridium-193. Making Iridium-192 gamma radiation sources using enriched Iridium-191 target material can almost double the activation efficiency and yield of Iridium-192, relative to natural iridium irradiations (the efficiency relationship is actually complex and depends on many factors, including total reactor loading, reactor flux and flux depression, which may be caused by overloading), pellet diameter and thickness and irradiation time. Reactor operators benefit the most from large cost savings and increase in reactor capacity, compared with irradiating natural iridium. Radiation source manufacturers typically receive little or no cost benefit from enriched iridium irradiations, however source quality and performance is improved due to the smaller focal dimension that can be achieved.

Due to the very high density of iridium (22.56 grams per cubic centimeter), a large proportion of gamma ray emissions from a source are self-attenuated within a source. A source with an output equivalent to 100 curies needs to contain between 150-200 curies actual content. One third to one half of the gamma ray emissions are lost due to self-attenuation within a source. The actual amount of attenuation depends of the disk stack height and diameter inside the source. Gamma radiography sources are sold on output activity, not content activity, so the cost of a source is considerably increased if valuable Iridium-192 is wasted due to excessive self-attenuation within a source.

FIG. 2 illustrates how the attenuation of Iridium-192 varies with distance in iridium metal. About 40 percent of all Iridium-192 emissions are absorbed by a one millimeter thickness of iridium.

A further drawback of high self-attenuation within a source is that lower energy emissions of Iridium-192 are preferentially attenuated, relative to higher energy emissions. This causes the gamma ray spectrum to be "hardened" (i.e. the average energy of the emissions is increased). This can be disadvantageous when radiographing thinner materials sections because higher energy decreases contrast and resolution is poorer in a radiographic image. It is beneficial to maximize emission of lower energy gamma rays in order to improve image quality.

Pure iridium is very hard and brittle. It melts at the very high temperature of 2447° Centigrade, which makes iridium (whether natural, or enriched) extremely difficult and costly to fabricate into thin disks that are suitable for irradiation, Very high temperature thermal processes are required.

Somewhat similar prior art is disclosed in WO/2004109716 A2 entitled "Method for Producing a Gamma Radiation Source".

Depleted Boron-11 is a byproduct of enriched Boron-10 manufacture. Enriched Boron-10 is used in the nuclear industry because of its unusually high neutron absorption cross section over a wide energy range (fast, epithermal and thermal), Boron-10 finds uses in boron tri-fluoride neutron detectors, as a neutron moderator and in neutron shielding. However, Boron-10 cannot be mixed with Iridium-192 in radiography sources because the activation cross section of Boron-10 is much too high so it would absorb an excessive number of neutrons during irradiations thereby depressing the yield. However, depleted Boron-11 (a byproduct of Boron-10 enrichment) has an extremely low neutron absorption cross section of the order of 5 millibarns. Depleted Boron-11 is relatively inexpensive.

Boron-11 does not significantly activate when irradiated with neutrons, so there are no interfering gamma-emitting impurities generated, which could interfere with the output or performance of an Iridium-192 gamma radiography source.

OBJECTS AND SUMMARY OF THE DISCLOSURE

It is an object of this disclosure to produce an improved gamma radiation source, with substantially reduced self-attenuation of gamma rays, increasing the proportion of lower energy emissions so as to improve output efficiency and image quality in radiography applications while reducing the cost of materials and irradiations by minimizing the activity content of sources, while maximizing the gamma ray output. The disclosure seeks to lower the density of iridium target material by alloying it (or making a composite, or a mixture) with a lower density, non-activating additive.

It is a further object of this disclosure to lower the processing temperature of the alloy or composite or mixture so that disk or pellet fabrication processes can be simplified.

It is therefore an object of the present disclosure to provide Iridium-191 disks at a reduced price for radiographic and similar applications.

It is therefore a further object of the present disclosure to maintain the pertinent performance characteristics of Iridium-191 disks at a reduced cost, for radiographic and similar applications.

These and other objects are obtained by the addition of a metal to the Iridium-191, thereby typically reducing the attenuation of the resulting disks. The possible metals include boron (particularly Boron-11), aluminum, silicon, vanadium, titanium, nickel, platinum, phosphorus and/or combinations thereof. Some embodiments may include alloying. In one embodiment, enriched Iridium-191 fine powder is sintered with a Boron-11 additive. Further embodiments include aluminum/boron/iridium (AL—B—Ir) alloys. It is further noted that platinum-boron alloys, analogous to iridium-boron alloys, also exist, thereby indicating the beta-minus decay product of iridium-192, platinum-192, will be expected to produce a physically stable alloy mixture with iridium-boron alloys and the target material will remain stable during and after irradiation, transmutation and decay.

BRIEF DESCRIPTION OF THE DRAWINGS

Further objects and advantages of the disclosure will become apparent from the following description and from the accompanying drawing, wherein:

FIGS. 1A-1E are views of a typical source reference assemblies, including encapsulation, which may be used with the source of the present embodiments.

DETAILED DESCRIPTION OF THE DISCLOSURE

Figure 2:
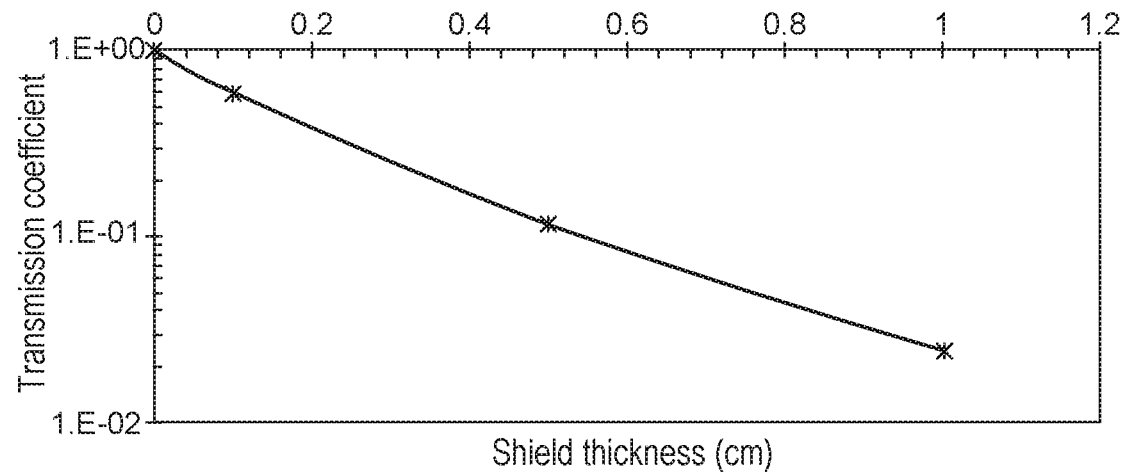
FIG. 2 illustrates how the attenuation of Iridium-192 varies with distance in iridium metal.

FIGS. 1A-1E illustrate prior art source reference devices 100 which may use the disclosed embodiments of the gamma radiation sources of the present disclosure. The source reference device 100 typically includes a proximal end 102 with an attachment device 104 and a distal end 106 with a source encapsulation 108. A tubular body 110 extends between the proximal end 102 and the distal end 106 and may include a spherical portion 112 to engage the inner walls of a pipe (not shown) or similar structure through which the source reference device 100 may travel. Various embodiments of the source encapsulation 108 are illustrated in the cross-sectional views of FIGS. 1B-1E. Generally, the source encapsulation 108 includes a fixture element 120 with a blind aperture 122 for receiving the distal end 106 of tubular body 110. The fixture element 120 further includes a distally extending male element 124 of reduced diameter which further includes a concentric blind aperture thereby forming a spring seat 126 for receiving and seating spring 130. Source encapsulation 108 further includes a forward head 132 which includes an interior chamber 134 for receiving the radioactive source material, either as a pellet 140 as shown in FIGS. 1B and 1D or as a series of disks 142 as shown in FIGS. 1C and 1E. The pellet 140 or the series of disks 142 is kept in place by spring 130. Forward head 132 further includes an inner concentric cylindrical portion 136 of somewhat increased diameter for receiving and seating the distally extending male element 124 of fixture element 120 thereby completing the assembly. This disclosure relates to improved methods for making the disks 142 or the pellet 140. FIGS. 1A-1E are meant as illustrations of possible uses for the product of the present disclosure. It is envisioned that the present disclosure is adaptable to a broad range of applications.

A first embodiment of the disclosure relates to a mixture of Boron-11 and Iridium-192, Enriched iridium-191 fine powder is sintered with a Boron-11 additive. It has been shown that boron added, at 37.5 atomic percentage and greater, to iridium produces a broad array of liquid-solid equilibrium conditions in the 1235 to 1290° Centigrade range. It may be typically desired to produce disk with a 0.25 millimeter thickness and a 2 millimeter diameter with enough strength to survive activating neutron irradiation. It may be further desired to exceed a 70 percent yield by increasing the concentration of Iridium in the 2 millimeter focal spot.

A typical procedure would be to use a 2.4 millimeter press die to press round disks about 0.3 millimeters thick, with 20 milligrams of powder per disk. The disks may typically be pressed with a 152 PSI gauge pressure with a ten second dwell time, with subsequent sintering. Those skilled in the art, after review of this disclosure, will realize that different applications may require different process variables.

Sintering is typically performed in an air furnace with a standard sintering cycle-ramp from room temperature (about 20° Centigrade) to soak temperature at 5 degrees Centigrade per minute, soak for the prescribed time, then cool at a controlled rate of 10 degrees Centigrade per minute.

Chemical protocols may be demonstrated or refined by using natural Boron-10 along with fine Iridium-193 ("Iridium Black").

The resulting disks or similar structures are typically subsequently activated by neutron irradiation and placed into structures similar to those illustrated in FIGS. 1A-1E to serve as radiation sources. In many instances, it may be commercially relevant to use the resulting disks in prior art devices, as a direct substitute for prior art radiation sources.

Figure 3:
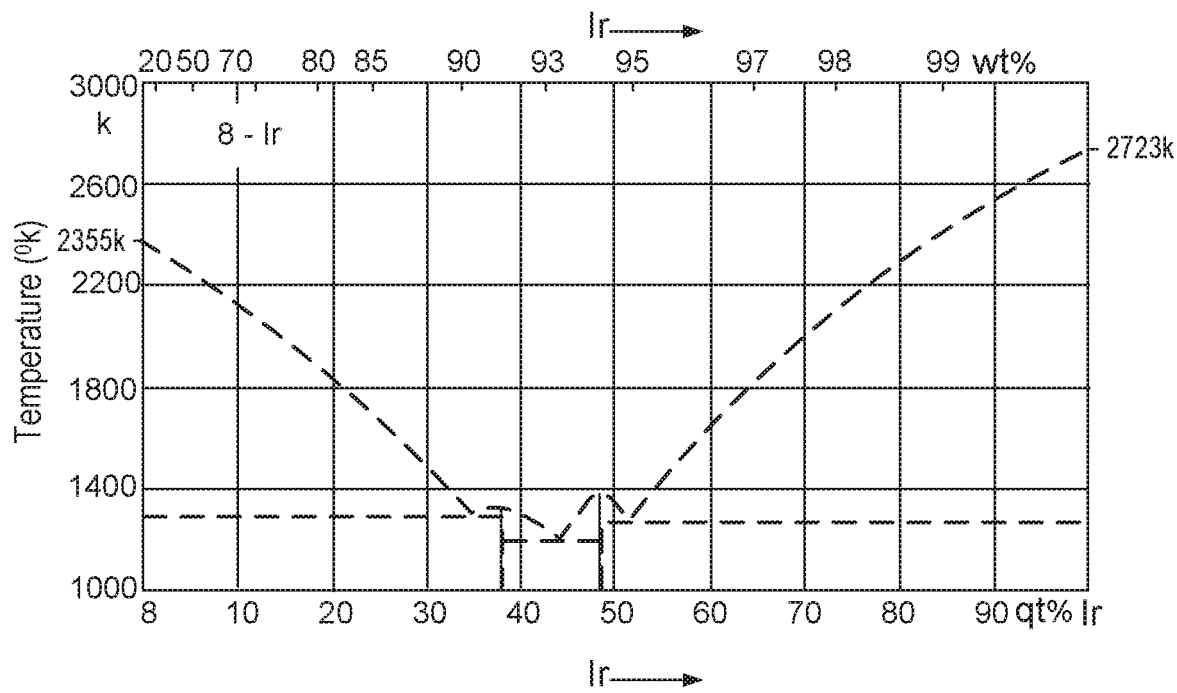
FIG. 3 is an iridium/boron phase diagram.

As further background to this disclosure, it is noted that boron forms useful alloys and intermetallic compounds with iridium, and boron additions substantially depress the melting temperature as shown in the Iridium/Boron phase diagram FIG. 3 (the x-axis is atomic percentage of Iridium, the y-axis is temperature. An Iridium/Boron mix with Iridium at approximately 52 atomic percent (equal to 95 weight percent) melts at a relatively low approximately 1000° Centigrade (1273° Kelvin) compared with the very high melting point of 2723° Kelvin for pure iridium and 2355° Kelvin for pure boron. This large depression of the melting point for the binary phase provides the opportunity of conventional furnace technology for the sintering.

It is further noted that pure boron has a low density of 2.37 grams per cubic centimeter compared with the density of iridium of 22.56 grams per cubic centimeter. Alloys and composites containing somewhere between 30-60 atom percentage iridium have low melting point below 1300° Centigrade and their densities are estimated to be in the range 10-16 grams per cubic centimeter (boron has an atomic radius of about 1.2 angstroms and iridium has an atomic radius of about 1.7 angstroms).

A reduction of density in the range 10-16 grams per cubic centimeter would have the following consequences:

1. The focal dimension of a source would be in-between that of an enriched Iridium-192 source and a natural Iridium-192 source, 63 percent of a natural Iridium-192 target is Iridium-193, whereas 20 percent of an enriched Iridium-192 target is Iridium-193. An Iridium-Boron alloy target can be made with the same atom percent of Iridium-191 as a natural iridium target with 44.4 percent enriched iridium (37 atomic percentage Iridium-191 atomic percentage Iridium-193) and 55.6 atomic percentage Boron-11. Boron has a smaller atomic radius than iridium, so a source containing 55.6 atomic percentage Boron-11 will have a smaller focal dimension than an equivalent natural iridium target, while its density will be much lower.

2. Decrease self-attenuation of Iridium-192 gamma rays in the range 10-30 percent (the percentage attenuation varies depending on the energy of the gamma ray). Iridium-192 has the following principle gamma rays: 206 kev (3.2%), 296 kev (28.3%), 308 kev (29.3%), 316 kev (83.0%), 468 kev (47.7%), 604 kev (8.23%), 612 kev (5.34%), the average emission energy is approximately 370 kev. The reduction in self-attenuation due to reduced density is more significant for lower energy emissions.

3. Increased activation yield. Activation yield is increased when an Iridium-191 target is diluted with a non-activating additive, having a low neutron activation cross section. This enables neutrons to penetrate to a greater depth within each Iridium-191 target disk, increasing the available neutron flux throughout the volume of a disk or pellet. Depending on geometry, target thickness and diameter and on how (and how many) irradiation canisters are filled and oriented within a reactor, this can increase yield up to about plus twenty percent relative to irradiating 100 percent dense enriched Iridium-191 and it can approximately double the yield relative to irradiating natural iridium.

4. Enable thicker disks to be irradiated. Lower density iridium can enable thicker disks to be irradiated without excessive loss of yield due to flux depression at the center of disks. This can significantly reduce manufacturing cost, because disk fabrication costs of pure (natural or enriched) iridium are high. By reducing the number of disks needed, the disk fabrication costs can be reduced proportionally and the cost of handling and stacking them in source production can also be reduced.

The benefits of higher emission, higher activation yield and lower costs have to be measured against the pros and cons of focal size (larger than 100 percent enriched Iridium-192 sources, but smaller than natural Iridium-192 sources). In some applications, the focal dimension is of paramount importance. In this case 100 percent enriched sources may be preferred. In other applications, softer energy spectrum and higher yield and output efficiency may provide more benefits, in which case enriched Iridium-Boron sources can be selected.

Focal dimension can also be minimized by changing from cylindrical geometry to a more spherical geometry. The lower melting point of Iridium-Boron alloys and composites increases the number of fabrication techniques that can be used in target manufacture (either before or after irradiation) to make more spherical target geometry.

Other non-activating, low density, stable additives or combinations thereof, can also be incorporated with iridium or with iridium-boron alloys or composites to enhance the activation yield, to increase gamma ray output efficiency and to improve the performance of sources.

A pure 100% enriched Iridium-191 pellet or disk (or any other shape be made by compacting and partially sintering iridium powder. Enriched Iridium-192 is produced in the physical form of iridium-black powder. This is very finely divided and has very small (in the nanometer range) particle size. It is an amorphous black powder produced when iridium hexafluoride gas is decomposed and reduced to iridium metal after the gas centrifuge enrichment process is completed. This material can be pressed into thin disks or other shapes in a simple die press and then it can be sintered at a high temperature.

It is common in many sintering processes, for densification of pressed compacts to begin at about seven eighths (or 87.5 percent) of the melting point in degrees Kelvin. At this temperature solid state diffusion and migration of atoms and molecules at points of contact between particles begins. In the case of pure iridium, this process begins at about 2100° C. Cold pressed powders of an incompressible and hard, refractory material like iridium can only be compacted up to about 60-65% of their theoretical density. Sintering further densifies the compact and 100% density can be achieved below the melting point under optimized conditions. If sintering is incomplete, the product may remain porous and brittle, connected only at points of contact between particles. Sintering can be controlled to produce a partially dense compact with, say 75% theoretical density and 25% empty void space inside, while the material may be robust enough to be handled and used in sources. Such a form of pellet or disk would provide a lower density form of iridium, while also eliminating the need to add additives. In this example, the open pore structure may make disks more prone to oxidation at high temperature (producing iridium oxide, $IrO_2$) and reduce durability.

A small amount of sintering additive can lower sintering temperature and accelerate the sintering process due to local melting at points of contact. For example, a few percent of Boron-11 powder can be blended with pure iridium-black powder. This significantly lowers the sintering temperature to a range somewhere between 1000° Centigrade to 1500° Centigrade, depending on the percentage of Boron-11 added. Points of contact between Boron-11 and Iridium-191 particles chemically react at the sintering temperature to produce low melting point Iridium-Boron alloys and composites within the structure. This is called "chemical sintering" where both sintering and chemical reaction occurs simultaneously. Chemical sintering with additives can be used to produce a partially sintered alloy or composite or a fully sintered alloy or composite depending on the percentage of additive used and the sintering time and temperature.

If more boron is added, the sintering temperature is reduced and more complete sintering is achieved up to 100% densification.

Other methods can also be used to fabricate disks and pellets having high boron content. These can include melting, fusing, casting, hot forging, hot pressing, extruding and conventional machining from castings or extrusions.

Other low-activating, low density additives can also be used to produce further embodiments of low density Iridium-192 target disks or pellets. Iridium forms alloys and composites with aluminum, silicon, aluminum boron mixtures (e.g. $AlBIr_3$), vanadium, aluminum silicon mixtures, aluminum vanadium mixtures, vanadium boron mixtures, titanium, nickel, platinum, and phosphorus all or some of which may enhance the physical properties, depending on the percentage of the additive. Some or all of these additives can be included to form binary, ternary or more complex alloys and composites, which may be either partially or fully sintered, fused, cast, hot pressed, forged, melted or otherwise thermally or physically processed to form disks or pellets suitable for radiation source manufacture. Those skilled in the art, after review of this disclosure, will realize that the production of different alloys or composites may require different process variables.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A gamma radiation source including a mixture of boron-11 and iridium.

2. The gamma radiation source of claim 1 wherein at least a portion of the iridium is isotopically enriched iridium-191.

3. The gamma radiation source of claim 1 wherein at least a portion of the iridium is iridium-192.

4. The gamma radiation source of claim 1 wherein the iridium includes a first portion of iridium-191 and a second portion of iridium-192.

5. The gamma radiation source of claim 4 wherein the second portion of iridium-192 is obtained by neutron irradiation of iridium-191.

6. The gamma radiation source of claim 1 wherein the boron-11 and the iridium are sintered.

7. The gamma radiation source of claim 1 wherein the boron-11 and the iridium form an alloy.

8. The gamma radiation source of claim 1 wherein the mixture of boron-11 and iridium is shaped as a disk.

9. The gamma radiation source of claim 1 wherein the mixture of boron-11 and iridium is shaped as a pellet.

10. The gamma radiation source of claim 1 wherein the mixture of boron-11 and iridium is subjected to a process selected from the group consisting of melting, fusing, casting, forging, pressing, extruding, machining from castings and machining from extrusions.

11. The gamma radiation source of claim 1 wherein the mixture further includes aluminum.

12. A gamma radiation source including a mixture of iridium and a metal selected from the group consisting of boron, aluminum, silicon, vanadium, titanium, nickel, phosphorus and combinations thereof; wherein the iridium includes a first portion of iridium-191 and a second portion of iridium-192.

13. The gamma radiation source of claim 12 wherein at least a portion of the iridium is isotopically enriched iridium-191.

14. The gamma radiation source of claim 12 wherein the second portion of iridium-192 is obtained by neutron irradiation of iridium-191.

15. The gamma radiation source of claim 12 wherein the selected metal and the iridium are sintered.

16. The gamma radiation source of claim 12 wherein the selected metal and the iridium form an alloy.

17. The gamma radiation source of claim 12 wherein the mixture of the selected metal and iridium is shaped as a disk.

18. The gamma radiation source of claim 12 wherein the mixture of the selected metal and iridium is shaped as a pellet.

19. The gamma radiation source of claim 12 wherein the mixture of the selected metal and iridium is subjected to a process selected from the group consisting of melting, fusing, casting, forging, pressing, extruding, machining from castings and machining from extrusions.

20. The gamma radiation source of claim 1 wherein the boron-11 reduces density and focal dimension of the gamma radiation source, as compared to a pure iridium gamma radiation source of cylindrical focal shape.

21. The gamma radiation source of claim 1 wherein the mixture of boron-11 and iridium is configured as a stack of disks.

* * * * *